United States Patent Office 3,579,564
Patented May 18, 1971

3,579,564
ESTERS OF 5-HYDROXYTETRACYCLINES
Robert K. Blackwood and Manfred Schach von Wittenau, Gales Ferry, Conn., assignors to Chas. Pfizer & Co., Inc., New York, N.Y.
No Drawing. Continuation-in-part of application Ser. No. 439,974, Mar. 15, 1966. This application Feb. 3, 1969, Ser. No. 796,202
Int. Cl. C07c *103/19, 139/76;* C07d *5/20*
U.S. Cl. 260—473                                            15 Claims

ABSTRACT OF THE DISCLOSURE

Esters of oxytetracyclines including $O^{12a}$-esters of oxytetracycline, α- and β-6-deoxy-oxytetracycline, 6-demethyl-6-deoxy-6-methyleneoxytetracycline, the mercaptan adducts of the latter compound and acid addition and metal salts of said esters and their utility as antibacterial agents and as intermediates in the preparation of other biologically active compounds.

CROSS-REFERENCE TO RELATED APPLICATION

This application is a continuation-in-part of copending application Ser. No. 439,974, filed Mar. 15, 1965, now abandoned.

BACKGROUND OF THE INVENTION

The present invention is concerned with a series of novel esters of a group of antibiotics and more particularly with new esters of oxytetracycline, α- and β-6-deoxy-oxytetracycline, 6-demethyl - 6 - deoxy-6-methyleneoxytetracycline, the mercaptan adducts of the latter compound, and the acid addition and metal salts of said esters.

Various esters of oxytetracycline are known. Gordon, in U.S. Patent 2,812,349, issued Nov. 5, 1957, described the $O^{12a}$-monoacyl and $O^5,O^{12a}$-diacyl derivatives of oxytetracycline. Blackwood, et al., U.S. Patent 3,047,617, issued July 31, 1962, described the $O^{10},O^{12a}$-diacyl derivatives of oxytetracycline, their rearrangement, in the presence of a water-soluble magnesium salt and an alkali metal, to the $O^5,O^{12a}$-diacyl compounds of the Gordon patent.

SUMMARY OF THE INVENTION

The compounds of the present invention are represented by the formulae

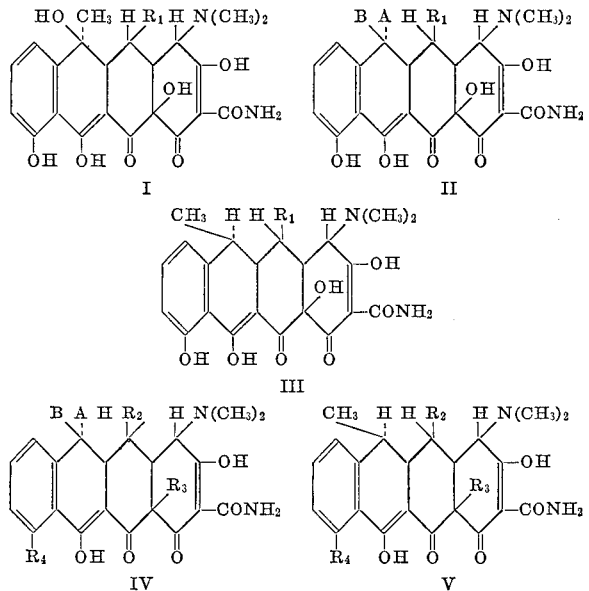

and the $O^{12a}$-phenoxyalkanoyloxy- and $O^{12a}$-lower alkoxyalkanoyloxy derivatives of oxytetracycline wherein A is selected from the group consisting of methyl and $YSCH_2$ wherein Y is selected from the group consisting of primary and secondary alkyl having up to 12 carbon atoms, phenyl, mono- and disubstituted phenyl, benzoyl, trifluoromethyl; $R''CO$ where $R''$ is alkyl of from 1 to 3 carbon atoms; and $R'CH_2$— wherein $R'$ is selected from the group consisting of mono- and disubstituted lower alkyl, lower carbalkoxy, halo, phenyl, mono- and disubstituted phenyl and furyl, each substituent of said mono- and disubstituted lower alkyl being selected from the group consisting of lower alkoxy, lower carbalkoxy, and halo, provided that where two of said substituents are joined to the same carbon atom at least one is lower carbalkoxy, and each substituent of said mono- and disubstituted phenyl being selected from the group consisting of lower alkyl, lower alkoxy, lower carbalkoxy and nitro;

B is hydrogen;

A and B when taken together are methylene;

$R_1$ and $R_3$ are each selected from the group consisting of alkanoyloxy, phenoxyalkanoyloxy, lower alkoxyalkanoyloxy, monochloroalkanoyloxy, monobromoalkanoyloxy, dichloroalkanoyloxy and dibromoalkanoyloxy, wherein the alkanoyloxy group has from 2 to 6 carbon atoms;

$R_2$ and $R_4$ are each selected from the group consisting of hydroxyl, alkanoyloxy, phenoxyalkanoyloxy, lower alkoxyalkanoyloxy, monochloroalkanoyloxy, monobromoalkanoyloxy, dichloroalkanoyloxy and dibromoalkanoyloxy, wherein the alkanoyloxy group has from 2 to 6 carbon atoms;

and the acid addition and metal salts thereof.

The present invention includes the esters of α-6-deoxy-oxytetracycline and β-6-deoxy-oxytetracycline and the acid addition and metal salts thereof. In the former compound the stereochemistry of the 6-methyl group is opposite to that of the known 6-deoxytetracyclines produced by catalytic hydrogenolysis of oxytetracycline (J. Am. Chem. Soc. 80, 5324, 1958). These novel esters are represented by Formulae II–V wherein $R_1$, $R_2$, $R_3$, and $R_4$ are as previously defined, A is methyl and B is hydrogen. The α- and β-6-deoxy-oxytetracyclines thus differ by virtue of the specific configuration of the groups at C–6. The stereochemistry of the other asymmetric centers of the compounds of the present invention is not indicated as a matter of convenience but does correspond, as those skilled in the art will appreciate, to that of the precursor from which the present compounds are derived. It is obvious, of course, that when A and B are taken to represent a methylene group, the stereochemistry at C–6, as indicated in Formulae II and IV, no longer exists.

The novel esters of this invention are useful as antibacterial agents and as intermediates in the preparation of other biologically active substances.

The novel $O^5$-monoacyl compounds described herein are useful as intermediates for the preparation of polyacylated oxytetracycline derivatives such as the $O^5,O^{12a}$-diacyl- and the $O^5,O^{10},O^{12a}$-triacyl derivatives by the processes of U.S. 2,812,349 and 3,047,617. They are especially useful for the formation of polyacyl derivatives having different acyl groups at the $O^5$- and $O^{10}$- and/or $O^{12a}$-positions. Further, the herein described esters of oxytetracycline can be catalytically hydrogenated, e.g., under acid conditions with palladium, or other noble metal catalyst, to the corresponding epimeric 6-deoxy-oxytetracycline esters described herein. Hydrogenation of the 6-demethyl - 6 - deoxy - 6 - methyleneoxytetracycline esters of this invention over a noble metal catalyst also yields a mixture of the corresponding C–6 epimeric esters. Raney nickel desulfurization of the benzylmercaptan adducts of the 6-demethyl-6-deoxy-6-methyleneoxytetracycline esters of this invention, the 13-benzylmercapto-α-6-deoxy-oxytetracycline esters, the compounds of Formula II and IV wherein B is hydrogen and A is benzylmercaptomethyl leads, almost exclusively, to α-6-deoxy-oxytetracycline esters.

Mild acid treatment of the esters, e.g., saturated methanolic hydrogen chloride, results in dehydration and formation of 5a,6-anhydro-$O^5$-acyl-oxytetracycline.

DETAILED DESCRIPTION OF THE INVENTION

The novel $O^5$-monoacyl-oxytetracyclines of this invention are prepared by rearrangement of the corresponding $O^{12a}$-monoacyl derivatives in an aqueous solution containing at least about an equimolar proportion, and preferably two molar proportions, based on the $O^{12a}$-monoacyl reactant, of an alkali metal hydroxide. The rearrangement can also be conducted in methanolic or ethanolic solution. In such solvent systems, it is advantageous to use an alkali metal alcoholate in place of an alkali metal hydroxide principally because of the better solubility of said alkali metal alcoholates in the alcohols. All the alkali metal hydroxides and alcoholates are operable including those of potassium, lithium and sodium. However, sodium hydroxide is preferred in aqueous systems and sodium alcoholates in alcoholic systems.

The temperature of the reaction is not critical, a range of from about 0° C. to about 500° C. being used. The preferred temperature is from about 0° C. to about 25° C.

Although the reaction time is not absolutely critical, prolonged reaction periods should be avoided in order to minimize degradation of the desired product. For optimum results, reaction periods of greater than two hours appear to offer no advantage. Reaction periods as brief as five minutes in many instances depending, of course, on the $O^{12a}$-monoacyl reactant produce satisfactory, if not optimum yields of rearranged product.

Products are isolated by adjusting the pH of the reaction mixture to a value of from about pH 2-7 and extraction therefrom with a water immiscible solvent, e.g., ethylacetate, and recovered therefrom by known methods. Frequently, when operating at the upper part of this pH range, part of the product precipitates and can be recovered by filtration or centrifugation, if desired.

The degradation of the esters, reactant, and product can be avoided, or at least minimized, by conducting the rearrangement in the presence of from about 1 to about 2 equivalents of a solvent soluble polyvalent metal salt. This permits a further embodiment of this process, the polyvalent metal stabilizing the esters through chelate formation. A wide variety of polyvalent metal salts, indeed all polyvalent metal salts soluble in the reaction solvent can be used. From a practical standpoint, however, it is important to employ solvent soluble salts, the $O^5$-monoacyl chelates of which can readily be decomposed to provide the metal-free $O^5$-monoacylated compounds. The favored polyvalent metal salts are those of calcium, magnesium, zinc, cadmium, copper, nickel, and cobalt. Of these, magnesium salts are preferred. Suitable magnesium salts for use in aqueous systems include chloride, sulfate, nitrate, acetate, formate bromide, chlorate, and iodide, but particular success has been achieved employing magnesium chloride hexahydrate. Other suitable magnesium salts include the propionate, butyrate, citrate, salicylate, sulfocarboxylate, benzoate, lactate, dithionate, ferricyanide, ferrocyanide, nitrite, perchlorate, hydrosulfide, thiocyanate, thiosulfate, fluoride, hydroxide, bromate, iodate, sulfate, tartrate, carbonate, as well as various water soluble double salts, e.g., magnesium ammonium chloride and magnesium ammonium sulfate. Of course, the anion of the magnesium salt must not react with or cause decomposition of the antibiotic. Strongly oxidizing or reducing anions such as permanganate are to be avoided.

When a polyvalent metal is present, the products are recovered by precipitation of the crude metal-ester complexes at a pH of about 6-8. The metal-ester complexes are separated by appropriate methods, resuspended in water, the pH adjusted to about 2-3.5 and the esters extracted into a suitable water immiscible solvent, e.g., ethyl acetate, and recovered therefrom.

As noted, $O^{12a}$-monoacyl derivatives are transformed to $O^5$-monoacyl derivatives by this rearrangement process. It has been found quite unexpectedly, that when $O^{10},O^{12a}$-diacyl derivatives are subjected to this rearrangement, the acyl group from the $O^{10}$-position is transferred to the $O^{12a}$-position and the $O^{12a}$-acyl group is transferred to the $O^5$-position. This is established by the rearrangement of $O^{10}$-propionyl-$O^{12a}$-acetyl-oxytetracycline to $O^{12a}$-propionyl-$O^5$-acetyl-oxytetracycline.

The $O^{12a}$-monoacyl and $O^5O^{12a}$-diacyl compounds are prepared according to the procedure of Gordon, U.S. 2,812,349, which comprises the reaction of the appropriate oxytetracycline reactant, the non-esterified forms of Formula I-V, with at least one molar proportion of a carboxylic acid anhydride in dioxane. Alternatively, and preferably, they are prepared by the use of the proper acid chloride in place of the acid anhydride of Gordon from the appropriate 5-oxy and $O^5$-acylated oxytetracyclines. Acetone, tetrahydrofuran, the methyl esters of ethylene glycol and diethyleneglycol and other inert solvents can be used in place of dioxane although the latter is favored since the hydrochloride salt of the oxytetracycline reactant readily crystallizes from this solvent. A 1:1 molar ratio of acid chloride to oxytetracycline reactant is preferred. The reaction is run at a temperature of from about 0° C. to about 50° C., preferably at from about 15° C. to about 40° C. Reaction periods of about 3 hours appear to be satisfactory in most instances. Since the hydrochloride salt of the oxytetracycline reactant precipitates from solution in most instances the extent of reaction can conveniently be followed by measurement of the amount of hydrochloride salt produced and the reaction period extended, if necessary.

The product is recovered by removing the precipitated hydrochloride salt and adding the mother liquor to a large volume of hexane or other nonsolvent for the ester products. The precipitated crude ester is separated, suspended in water, the pH adjusted to about 2, the product extracted with ethylacetate and recovered therefrom. Extraction of the thus-obtained product with ether provides a product of good purity which can be further purified by recrystallization from a suitable solvent system.

The $O^{10},O^{12a}$-diacyl and the $O^5,O^{10},O^{12a}$-triacyl compounds are prepared by the method of Blackwood et al., U.S. 3,047,617, which comprises treating one molar proportion of oxytetracycline reactant with from about 2 to 8 molar proportions of carboxylic acid anhydride in the presence of from about 2 to 8 molar proportions of pyridine at a temperature of from about 15° C. to 40° C. Mild hydrolysis of the $O^{10},O^{12a}$-diacyl compounds according to U.S. 3,047,617 produces the $O^{12a}$-monoacylated products.

It is, of course, obvious that mixed esters can be prepared by further esterification of an oxytetracycline reactant which contains at least one ester group. For example, an $O^{12a}$-acetyl derivative can be further esterified to an $O^{10}$-propionyl-$O^{12a}$-acetyl; or an $O^5$-acetyl can be converted to an $O^5$-acetyl-$O^{10},O^{12a}$-dipropionyl derivative. The latter triester can be transformed by hydrolysis of the $O^{10}$-acyl group to an $O^5$-acetyl-$O^{12a}$-propionyl derivative which in turn can be further esterified to a triester having three different ester groups.

The 6-demethyl-6-deoxy-6-methyleneoxytetracyclines and the mercaptan adducts thereof utilized as reactants herein are prepared according to U.S. Pats. 2,984,686 (May 16, 1961) and 3,165,531 (Jan. 12, 1965), respectively.

The acid addition and metal salts are prepared by treatment of the herein described esters in an inert solvent with one equivalent of a suitable acid or base. The metal salt complexes are prepared in a similar fashion. The latter are most suitably recovered by evaporation of the solvent. Such procedure is also applicable to recovery of the acid addition and metal salts, but a somewhat simpler method is to add a miscible nonsolvent for the salt or complex to effect precipitation thereof. The metal salts such as the sodium, potassium, and lithium salts are, of course, useful starting materials for the rearrangement process described herein. These and other salts, including the acid addition salts are frequently readily crystallized and thus are useful forms in which to isolate the desired esters.

The herein described compounds are useful for the same general purposes and in the same general manner as the known parent tetracyclines. The $O^5$-monoacylated oxytetracyclines and derivatives thereof described herein are less active in vitro than are the parent oxytetracyclines but more active than the $O^{12a}$-monoacylated oxytetracyclines. They do, however, exhibit a rather surprising and unexpectedly high order of in vivo activity. Indeed, the $O^5$-monoacyl derivatives of Formulae I-III are the preferred compounds of this invention because of their superior oral absorption as demonstrated by tests in mice. Those compounds having an $\alpha$-orientation of the substituent group A at C-6, Formulae II and IV, are of particular interest and generally favored over the corresponding $\beta$-epimers of Formulae III and V by reason of their higher order of activity against a variety of micro-organisms.

The in vivo activity of $O^5$-acetyl oxytetracycline is demonstrated by producing acute experimental infections in mice by the intraperitoneal inoculation of the mice with a standardized culture of *Pasteurella multocida* or *Steptomyces pyogenes* suspended in blood broth. Infection severity is standardized so that the mice receive 1–10 $LD_{100}$ doses of either organism. [$LD_{100}$: enough organisms to consistently kill 100% of the infected, non-treated control mice.] The test compounds are administered to the infected mice by a multiple dosing regimen in which the first dose is administered 0.5 hour after inoculation and is repeated 4, 24, and 48 hours later. The mice surviving after the last treatment are held for four days and the percent alive is then calculated (Table I):

TABLE I.—ANIMAL PROTECTION STUDIES [1]

| Tetracycline | P. multocida | | | S. pyogenes | | |
|---|---|---|---|---|---|---|
| | Dose, mg./kg. | Oral survivors | SQ [2] survivors | Dose, mg./kg. | Oral survivors | SQ survivors |
| $O^5$-acetoxy [3] | 50 | 1/5 | 5/5 | 50 | 3/5 | 4/5 |
| | 12.5 | 0/5 | 0/5 | 12.5 | 0/5 | 0/5 |
| | 3.12 | 0/5 | 0/5 | 3.12 | 0/5 | 0/5 |
| | 0.78 | 0/5 | 0/5 | 0.78 | 0/5 | 0/5 |
| $O^{12a}$-acetoxy [4] | 100 | 0/5 | 1/5 | 100 | 0/5 | 3/5 |
| | 50 | 0/5 | 0/5 | 50 | 0/5 | 1/5 |
| | 25 | 0/5 | 0/5 | 25 | 0/5 | 0/5 |
| | 12.5 | 0/5 | 0/5 | 12.5 | 0/5 | 0/5 |

[1] 20 mice are run as a positive control using a known positive drug, e.g., tetracycline; an infected, nonmedicated control group of 30 mice is run as a virulence control.
[2] SQ=Subcutaneous route of administration.
[3] Nitrate salt used.
[4] Sulfate salt used.

These values are then converted to prohibits and the $PD_{50}$ value (the dose of drug required to protect 50% of the treatment mice against the otherwise lethal infection) calculated. The following $PD_{50}$ values are thus obtained for $O^5$-acetoxy and $O^{12a}$-acetoxytetracyclines (Table II):

TABLE II

| Tetracycline | [$PD_{50}$ (mg./kg.) of $O^5$-acetoxy- and $O^{12a}$-acetoxytetracycline] | | | |
|---|---|---|---|---|
| | P. multocida | | S. pyogenes | |
| | Oral | SQ [1] | Oral | SQ |
| $O^5$-acetoxy [2] | >50 | 25 | 44 | 35 |
| $O^{12a}$-acetoxy [3] | >100 | >100 | >100 | 85 |

[1] SQ=Subcutaneous route of administration.
[2] Nitrate salt used.
[3] Sulfate salt used.

The oral activity of $O^5$-acetoxytetracycline is thus seen to approach its parenteral activity. $O^{12a}$-acetoxytetracycline, on the other hand, shows poor oral absorption as reflected by the high oral $PD_{50}$ data.

Other $O^5$-monoacyl derivatives of oxytetracycline when tested in like manner gave the following $PD_{50}$ values. The corresponding $O^{12a}$-monoacyl derivatives are included for the purpose of comparison (Table III).

TABLE III

[$PD_{50}$ (mg./kg.) of certain $O^5$-monoacyloxy- and $O^{12a}$-monoacyloxytetracyclines]

| | P. multocida | | | | S. pyogenes | | | |
|---|---|---|---|---|---|---|---|---|
| | Monoacyloxytetraxycline | | | | | | | |
| | $O^{12a}$- | | $O^5$- | | $O^{12a}$- | | $O^5$- | |
| | Oral | SQ | Oral | SQ | Oral | SQ | Oral | SQ |
| Propionyloxy | <50 | | | 39 | <50 | 11 | 36 | 36 |
| Methoxyacetoxy | 10, 30 | | | 50, 68 | <100 | 5.5, 20 | 50, 78 | 2.5, 28 |
| Chloroacetoxy | <6, 12 | | | 50 | 7.3, 8.8 | <6, <6 | 17 | 5.3 |

In addition to the esters mentioned above, other esters can be prepared as described herein in which the alkanoyl group is substituted with, for example, at least one of the following groups: lower acylamino, lower acyloxy, lower alkoxy, lower alkyl and di(lower alkyl)amino, phenyl, phenoxy, substituted phenyl and substituted phenoxy, wherein the substituted is at least one of the group halo, lower acyloxy, lower alkoxy, lower acylamino, lower alkyl and di(lower alkyl)amino, lower alkyl. The terms lower alkyl, lower acyl, and lower alkoxy include alkyl, acyl, and alkoxy groups having from 1 to 4 carbon atoms. Representative of such groups are those derived from the following acids: phenylacetic acid, phenoxyacetic acid, methoxyacetic acid, $\beta$-butoxypropionic acid, o-anisoxyacetic acid, p-tolyl acetic acid, p-acetaminophenylacetic acid and p-diethylaminophenylacetic acid. Further, the esterifying group can also be derived from chloroformic acid

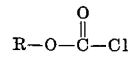

wherein R is one of the above-mentioned groups; or from di-(lower alkyl)carbamic acid chlorides, or from acids having the formula

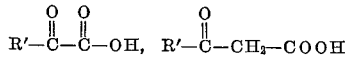

wherein R' is lower alkyl, di(lower alkyl)amino, lower alkoxy, phenyl or substituted lower alkyl and substituted phenyl. Additionally (O-arylcarbonyl) derivatives can be prepared by reaction of the oxytetracycline compound with the appropriate aryl isocyanate under anhydrous conditions in an inert solvent as described by Blackwood et al., in U.S. 2,976,318, issued May 21, 1961. Suitable aryl isocyanates are the phenyl- and naphthyl- ($\alpha$- and $\beta$-) isocyanates and the mono- and di- substituted derivatives thereof wherein the substituents are as defined above.

The following examples are given by way of illustration and are not to be considered as the sole embodiments of this invention or as limiting the scope thereof in any way.

Example I.—O⁵-acetyl-oxytetracycline

To a stirred mixture of 16.7 g. of O$^{12a}$-acetyl-oxytetracycline (prepared according to Example III of U.S. 3,047,617), 200 ml. of water and 19.1 ml. of 1 M aqueous magnesium chloride hexahydrate solution cooled to 10° C. is added 72.4 ml. of 1 M aqueous sodium hydroxide solution. The clear solution which results is allowed to stand at room temperature for one hour. The solution, pH 12.0, is then adjusted to pH 6.7 with concentrated hydrogen chloride. The solid which precipitates is filtered off, washed with water, then slurried in 400 ml. of water. The slurry is adjusted to pH 2.5 and extracted with chloroform. Evaporation of the dried chloroform extract gives crude O$^5$-acetyl-oxytetracycline.

The product is purified by dissolving in water (3.5 ml. per 1.15 g. of crude) and 0.4 ml. of nitric acid (per 1.15 g. crude). The nitrate salt precipitates but to insure complete precipitation, the mixture is chilled overnight. The crystalline nitrate salt is filtered off, washed with ether and dried.

Example II.—O⁵-propionyl-oxytetracycline

A mixture of 20.75 g. of O$^{12a}$-propionyl-oxytetracycline (prepared according to the procedures of Examples III and IV of U.S. 3,047,617), 225 ml. of water and 20 ml. of 1 M magnesium chloride hexahydrate solution is cooled to 5° C. Sodium hydroxide, 100 ml. of 1 M aqueous solution, is added with stirring and the resulting clear solution allowed to stand at room temperature for two hours. The pH is then adjusted to 6.8 with concentrated hydrochloric acid and the solid which forms removed by filtration. The filter cake is washed with water then slurried in 500 ml. water. Ether (500 ml.) is added and the pH of the aqueous phase adjusted to 2.8 with concentrated hydrochloric acid. The mixture is thoroughly shaken, the ether layer separated, and the aqueous phase concentrated to small volume. The concentrate is extracted with two 300 ml. volumes of ether and the combined ether extracts dried over anhydrous sodium sulfate and evaporated to dryness.

The crude O$^5$-propionyl-oxytetracycline is slurried in water (100 ml. per 4.4 g.) and concentrated nitric acid (1.8 ml. per 4.4 g. crude) added. A heavy solid forms almost immediately. Fifteen ml. of a solution of concentrated nitric acid and water (the same proportions as used above) is added, the mixture stirred at room temperature for 15 minutes then chilled for 30 minutes. The crystalline product is filtered off, washed with a small volume of water, followed by ether then dried in vacuo under nitrogen. Additional product is recovered from the filtrate by further chilling.

*Analysis.*—Calcd. for $C_{25}H_{28}O_{10}N_2 \cdot HNO_3$ (percent): 51.81, C; 5.04, H; 7.25, N. Found (percent): 51.11, C; 5.27, H; 6.98, N.

The above procedure is repeated but using in place of O$^{12a}$-propionyl-oxytetracycline the following O$^{12a}$-alkanoyl-oxytetracyclines: O$^{12a}$-phenoxyacetyl-, O$^{12a}$-methoxyacetyl-, O$^{12a}$-valeryl-, O$^{12a}$-butyryl-, O$^{12a}$-caproyl. In each case the corresponding O$^5$-acyl derivative is produced.

Example III.—O$^{12a}$-acetyl- and O$^5$,O$^{12a}$-diacetyl-α-6-deoxy-oxytetracycline Amphoteric α-6-deoxy-oxytetracycline (5 g.) is dissolved in 80 ml. of dioxane by warming. The solution is cooled to room temperature. Acetic anhydride (320 ml.) is added and the solution allowed to stand for 6 days at room temperature. The reaction mixture is taken to dryness on a rotating evaporator. The residue is taken up in ether (300 ml.) and filtered. The ether mother liquor is stripped to dryness and the residue stirred with 300 ml. of hexane to precipitate a crude product containing O$^{12a}$-acetyl-, O$^5$,O$^{12a}$-diacetyl and unreacted starting material (5.14 g.).

The crude product (5.14 g.) is recovered by filtration, taken up in 50 ml. of acetone and clarified. Upon addition of the solution to 85 ml. of stirred water, the bulk of the O$^5$,O$^{12a}$-diacetyl derivative crystallizes. The yield, upon filtration, washing with 50% aqueous acetone and drying, is 1.21 g.

The mother liquor is stripped of acetone and freeze dried. The residue is crystallized from refluxing toluene, with use of a Dean-Stark trap to remove water. The O$^{12a}$-acetyl compound is obtained upon cooling. Recovery by filtration gives 1.12 g. of O$^{12a}$-acetyl derivative. Complete conversion of starting material to the O$^5$,O$^{12a}$-diester is obtained by extending the reaction time to two weeks.

Example IV.—O⁵,O$^{12a}$-diacetyl-β-6-deoxy-oxytetracycline

β-6-deoxy-oxytetracycline (3.8 g.) is dissolved in 75 ml. dioxane and treated at room temperature with acetic anhydride (300 ml.). After standing for 2 weeks, the mixture is filtered and evaporated to dryness. The residue is taken up in toluene and the evaporation repeated. The residue is dissolved in ether-acetone (3:1), decolorized with activated charcoal, and again taken to dryness. The residue is extracted with cyclohexane residue remaining after evaporation of the cyclohexane dissolved in ether. Cyclohexane is added to precipitate the product which is recovered by filtration. Concentration of the filtrate provides additional product.

Example V.—O¹⁰,O$^{12a}$-diacetyl-6-demethyl-6-deoxy-6-methylene-oxytetracycline Anhydrous - 6 - demethyl-6-deoxy-6-methylene - oxytetracycline (36 g.) is dissolved in 380 ml. of dry dioxane under an atmosphere of nitrogen. Acetic anhydride (144 ml.) and dry pyridine (2.16 ml.) are added, the mixture seeded with O$^{10}$,O$^{12a}$-diacetyl-6-demethyl-6-deoxy-6-methylene-oxytetracycline from a previous preparation and stirred at room temperature for one hour and fifteen minutes. The reaction mixture is then filtered, the filter cake washed with dry dioxane followed by ether, then air dried.

Using the appropriate oxytetracycline derivative, the following O$^{10}$,O$^{12a}$-diacyl-oxytetracyclines are similarly prepared. The products, however, are isolated by the addition of hexane to the reaction mixture. The product, generally an oil, remaining after decantation of the hexane solution is stirred with water. The resulting solid is recovered by filtration and dried.

O$^{10}$,O$^{12a}$-diacetyl-α-6-deoxy-13-(benzylmercapto)-
O$^{10}$,O$^{12a}$-dibutyryl-6-demethyl-6-deoxy-6-methylene-
O$^{10}$,O$^{12a}$-diacetyl-α-6-deoxy-
O$^{10}$,O$^{12a}$-di(chloroacetyl)-6-demethyl-6-deoxy-6-methylene-
O$^{10}$,O$^{12a}$-di(chloroacetyl)-α-6-deoxy-
O$^{10}$,O$^{12a}$-di(dichloroacetyl)-β-6-deoxy-
O$^{10}$,O$^{12a}$-di(γ-bromobutyryl)-β-6-deoxy-
O$^{10}$,O$^{12a}$-di(β-chloropropionyl)-6-demethyl-6-deoxy-6-methylene-
O$^{10}$,O$^{12a}$-di(dichloroacetyl)-6-demethyl-6-deoxy-6-methylene-
O$^{10}$,O$^{12a}$-di(6-chlorocaproyl)-α-6-deoxy-
O$^{10}$,O$^{12a}$-di(α,α-dichloropropionyl)-6-demethyl-6-deoxy-6-methylene-
O$^{10}$,O$^{12a}$-di(chloroacetyl)-α-6-deoxy-13-benzylmercapto-
O$^{10}$,O$^{12a}$-diacetyl-α-6-deoxy-13-(furfurylmercapto)-
O$^{10}$,O$^{12a}$-diacetyl-β-deoxy-
O$^{10}$,O$^{12a}$-dipropionyl-α-6-deoxy-
O$^{10}$,O$^{12a}$-divaleryl-
O$^{10}$,O$^{12a}$-dipropionyl-6-demethyl-6-deoxy-6-methylene-
O$^{10}$,O$^{12a}$-di(propoxybutyryl)-6-demethyl-6-deoxy-6-methylene-
O$^{10}$,O$^{12a}$-diacetyl-α-6-deoxy-13-(acetylmercapto)-
O$^{10}$,O$^{12a}$-diacetyl-α-6-deoxy-13-(n-dodecylmercapto)-
O$^{10}$,O$^{12a}$-dipropionyl-α-6-deoxy-13-(issooctylmercapto)-
O$^{10}$,O$^{12a}$-dicaproyl-α-6-deoxy-
O$^{10}$,O$^{12a}$-diisovaleryl-α-6-deoxy-
O$^{10}$,O$^{12a}$-diacetyl-α-6-deoxy-13-(methylmercapto)-
O$^{10}$,O$^{12a}$-diisobutyryl-β-6-deoxy-
O$^{10}$,O$^{12a}$-di(phenoxyacetyl)-β-6-deoxy- $O^{10},O^{12a}$-di(methoxyacetyl)-β-6-deoxy-
$O^{10},O^{12a}$-di(β-butoxypropionyl)-
$O^{10},O^{12a}$-di(β-phenoxycaproyl)-
$O^{10},O^{12a}$-di(methoxyacetyl)-
$O^{10},O^{12a}$-di(phenoxyacetyl)-
$O^{10},O^{12a}$-di-(w-propoxybutyryl)-
$O^{10},O^{12a}$-di(α-phenoxyvaleryl)-
$O^{10},O^{12a}$-diacetyl-α-6-deoxy-13-(phenylmercapto)-
$O^{10},O^{12a}$-di-(methoxyacetoxy)-α-6-deoxy-13-(trifluoromethylmercapto)-
$O^{10},O^{12a}$-di(phenoxyacetyl)-α-6-deoxy-
$O^{10},O^{12a}$-di-(w-phenoxypropionyl)-α-6-deoxy-
$O^{10},O^{12a}$-di-(methoxyacetyl)-6-demethyl-6-deoxy-6-methylene-
$O^{10},O^{12a}$-di(bromoacetyl)-α-6-deoxy-13-methylmercapto- Example VI.—$O^{12a}$-acetyl-6-demethyl-6-deoxy-6-methylene-oxytetracycline $O^{10},O^{12a}$ - diacetyl - 6 - demethyl - 6 - deoxy - 6 - methylene-oxytetracycline (20.7 g.) is added to a solution of 450 ml. of water and 12.4 ml. of 29% ammonium hydroxide. The mixture is stirred at room temperature for 35 minutes at the end of which time 100 ml. of ethylacetate is added and the pH adjusted to pH 4.5 and extracted with four 75 ml. portions of ethylacetate. The combined ethylacetate extracts are dried over anhydrous sodium sulfate, then evaporated to dryness. The residue is taken up in ether and evaporated to dryness to give the solid $O^{12a}$-acetyl derivative.

By means of this procedure, the remaining $O^{10},O^{12a}$-diacyl derivatives of Example V are hydrolized to the corresponding $O^{12a}$-acyl derivatives.

Example VII.—$O^5$-acetyl-6-demethyl-6-deoxy-6-methylene-oxytetracycline

6 - demethyl - 6 - deoxy - 6 - methylene - $O^{12a}$ - acetyl-oxytetracycline (3.15 g., prepared according to Example VI) is mixed with 30 ml. of water and the mixture cooled at 5° C. Sodium hydroxide (15 ml. of 1 M aqueous solution) is added and the mixture stirred at 5° C. for ten minutes. Ethylacetate (50 ml.) is added and the pH adjusted to 4.5 with hydrochloric acid. The solid which forms at the interface is filtered off and the ethylacetate phase separated. The aqueous phase is extracted with three 25 ml. volumes of ethylacetate, the ethylacetate extracts combined, washed twice with 5 ml. of 0.01 N hydrochloric acid, then dried over anhydrous sodium sulfate. The dried ethylacetate is treated with charcoal, filtered and evaporated to dryness to give the desired ester.

Repetition of the above procedure but substituting the $O^{12a}$-acyl derivatives of Example VI for 6-demethyl-6-deoxy-6-methylene - $O^{12a}$ - acetyl-oxytetracycline produces the corresponding $O^5$-acylated-oxytetracyclines.

Example VIII.—$O^5$-acetyl-oxytetracycline

The procedure of Example I is repeated but using the following metal salts in place of magnesium chloride hexahydrate. In each instance the desired ester is produced.

magnesium sulfate—cadmium chlorate .2$H_2O$
magnesium citrate—cadium formate .2$H_2O$
calcium chloride—copper (II) bromide
calcium nitrate—copper (II) sulfate .5$H_2O$
zinc acetate—cobalt (II) acetate
zinc chloride—cobalt (II) iodide Example IX.—$O^{12a}$-acyl-oxytetracyclines Two equivalents of methoxyacetyl chloride is added to a solution of 0.005 mole of 6-demethyl-6-deoxy-6-methylene-oxytetracycline in 25 ml. of dry dioxane. The mixture is stirred thoroughly, allowed to stand at room temperature for three hours, then filtered to remove the hydrochloride salt of the oxytetracycline reactant. The filtrate is gradually added to 300 ml. of hexane with stirring. The crude product is filtered off, washed with hexane and suspended in 40 ml. of water-ethylacetate (1:1). The pH is lowered to 2, the mixture thoroughly mixed and the ethyl aceate layer separated. The extraction is repeated (5×10 ml.) and the combined extracts washed with water (3×1 ml.), dried over anhydrous sodium sulfate and decolorized with charcoal. The solvent is removed and the residue stirred with ether (300 ml./gm. of product) for up to 18 hours. The ethereal solution is removed and evaporated to dryness to give the product.

Further purification, if necessary or desirable, is achieved by crystallization from one or more of the following systems:

chloroform
chloroform plus hexane
chloroform plus benzene
water
isopropyl alcohol plus water
ethanol (or methanol) plus water
1,2-dimethoxyethane plus water
methanol+one equivalent of sulfuric acid (provides sulfate salt)

The following $O^{12a}$-acyl-oxytetracyclines are prepared by this procedure from the appropriate reactants:

$O^{12a}$-acetyl-α-6-deoxy-13-(2,6-dimethylphenylmercapto)-
$O^{12a}$-butyryl-α-6-deoxy-13-(β-butoxyethylmercapto)-
$O^{12a}$-acetyl-α-6-deoxy-13-(2,3-dichloropropylmercapto)-
$O^{12a}$-valeryl-α-6-deoxy-13-(4-carbomethoxyphenylmercapto)-
$O^{12a}$-butyryl-α-6-deoxy-13-(carbobutoxymethylmercapto)-
$O^{12a}$-phenoxyacetyl-6-demethyl-6-deoxy-6-methylene-
$O^{12a}$-β-phenoxypropionyl-6-demethyl-6-deoxy-6-methylene-
$O^{12a}$-w-phenoxycaproyl-6-demethyl-6-deoxy-6-methylene-
$O^{12a}$-β-butoxybutyryl-6-demethyl-6-deoxy-6-methylene-
$O^{12a}$-α-phenoxyvaleryl-β-6-deoxy-
$O^{12a}$-methoxyacetyl-
$O^{12a}$-phenoxyacetyl- Example X The $O^{12a}$-acyl-oxytetracyclines of Example IX are rearranged to the corresponding $O^5$-acyl derivatives by the procedure of Example VII.

Example XI.—$O^{12a}$-methoxyacetyl-oxytetracycline

Anhydrous oxyptetracycline base (368 g., 0.8 mole) is dissolved in 4 liters of dry dioxane (dried over Linde 4A Molecular Sieve, produced and distributed by the Linde Company). To this solution there is added methoxyacetyl chloride (0.4 mole, 36.8 ml.). The solution is stirred for six minutes and then allowed to stand at room temperature for 3.5 hours. Oxytetracycline hydrochloride (150 g., 38%) is recovered by filtration with a dioxane wash. The crude ester, recovered by freeze drying the mother liquor, is dissolved in 1400 ml. of water. Ethyl acetate (1400 ml.) is added and (with stirring) the pH of the aqueous layer adjusted to 5.0 with 2 N aqueous sodium hydroxide. The ethyl acetate layer is separated and the aqueous layer washed with three additional 1 liter portions of ethyl acetate. The combined ethyl acetate extractions are treated with ca. 20 g. of Darco G60, filtered and then dried over sodium sulfate. The ethyl acetate solution is stripped to dryness (bath temperature, 40° C.). The residue is taken up in 5 liters of chloroform, filtered, seeded, and held at room temperature for four hours. The crystalline product is recovered by filtration and washed with chloroform. The yield of air dried $O^{12a}$-methoxyacetyl-oxytetracycline is 139.7 g. (33% based on oxytetracycline, 66% based on actual stoichiometry).

Example XII.—$O^5$-methoxyacetyl-oxytetracycline nitrate $O^{12}$-methoxyacetyl-oxytetracycline (148.9 g.) is dissolved in a mixture of 800 ml. of water and 1500 ml. of ethyl acetate. The two-phase solution is cooled to 0°–5°

C. by means of an ice bath. Aqueous 1 N sodium hydroxide (700 ml.) is added while maintaining the temperature below 10° C. The cold solution is stirred an additional 5 minutes then adjusted to pH 4.8 with hydrochloric acid. The ethyl acetate layer is separated and the aqueous phase extracted with ethyl acetate (3×1 liter). The combined ethyl acetate solutions are back washed twice with 250 ml. portions of 0.01 N hydrochloric acid, and dried over sodium sulfate. The ethyl acetate solution is stripped to dryness and dried by addition and re-evaporation of ether. The yield of crude base is 111.3 g. (75%).

A typical crystallization of $O^5$-methoxyacetate as the nitrate was as follows: Crude base, 95 g. is dissolved in 1 liter of acetone, filtered and washed with acetone to a total volume of 1.8 liters of acetone. To the stirred mother liquor there is added 17.9 ml. of concentrated nitric acid. The solution is seeded and stirred for 20 minutes, and the product recovered by filtration. It is washed well with acetone and finally reslurried in ether. The yield is 55.4 g. (52% from crude base, 39% overall from $O^{12a}$-ester). Analysis shows the salt to be monohydrate.

Calcd. for $C_{25}H_{28}O_{11}N_2 \cdot HNO_3 \cdot H_2O$ (percent): C, 48.94; H, 5.09; N, 6.85. Found (percent): C, 48.68; H, 4.92; N, 6.79.

Example XIII.—$O^{12a}$-chloroacetyl-oxytetracycline

To a solution of anhydrous oxytetracycline base (92.0 g., 0.2 mole) in dry dioxane (1 liter) is added chloroacetyl chloride (160 ml.). The mixture is stirred for five minutes then held at room temperature for 3.5 hours. The by-product oxytetracycline hydrochloride is filtered off (48.9 g.) and washed with dioxane. The filtrate and wash liquor are combined and added to hexane (5 liters). The resulting precipitate of crude ester is filtered off, washed with hexane and dried under nitrogen (78.7 g.).

The crude ester is slurried in water (1 liter), ethyl acetate (1 liter) added and the pH adjusted to 2.0 with aqueous sodium hydroxide. The mixture is filtered and the ethyl acetate layer separate. The aqueous phase is then extracted with ethyl acetate (3×300 ml.). The ethyl acetate solutions are combined, back washed with water (3×10 ml.), decolorized with Darco G60, and dried over anhydrous sodium sulfate. The dry ethyl acetate solution is filtered then stripped to dryness below 40° C.

The residue (45.9 g.) of partially purified ester is slurried overnight in ether (6 liters). The insoluble material is removed by filtration and reslurried in ether (3 liters) overnight. The slurry is filtered and the combined ether solutions evaporated to dryness to give crude ester (24.68 g.). The residue is taken up in chloroform (350 ml.) and the solution allowed to stand overnight. The crystalline product is removed by filtration and dried (18.90 g.).

An analytical sample is obtained by a further recrystallization from chloroform.

In like manner, the following $O^{12a}$-acyl-oxytetracyclines are prepared from appropriate reactants:

$O^{12a}$-($\alpha$-chlorobutryl)-
$O^{12a}$-chloroacetyl-6-demethyl-6-deoxy-6-methylene-
$O^{12a}$-(6-bromocaproyl)-$\beta$-6-deoxy-
$O^{12a}$-($\alpha,\beta$-dichloropropinoyl)-$\alpha$-6-deoxy-
$O^{12a}$-($\beta$-chloropropinoyl)-$\beta$-6-deoxy-
$O^{12a}$-($\alpha$-bromobutyryl)-
$O^{12a}$-($\alpha$-chloropropionyl)-$\alpha$-6-deoxy-13-(benzylmercapto)-
$O^{12a}$-(2,6-dibromocaproyl)-$\alpha$-6-doxy-13-(2,3-dichloropropylmercapto)-
$O^{12a}$-dichloroacetyl-
$O^{12a}$-dichloroacetyl-$\alpha$-6-deoxy-
$O^{12a}$-chloroacetyl-$\alpha$-6-deoxy-
$O^{12a}$-dichloroacetyl-6-demethyl-6-deoxy-6-methylene- Example XIV.—$O^5$-chloroacetyl-oxytetracycline nitrate $O^{12a}$-chloroacetyl-oxytetracycline (10.72 g., 0.02 mole) is slurried in water (400 ml.) at 5° C. Aqueous sodium hydroxide (45.0 ml. of 1 N) is added and the mixture stirred for ten minutes at 5° C. Ethyl acetate (400 ml.) is then added and stirring continued for an additional five minutes. The pH (9.4) is brought to 2.9 by addition of concentrated hydrochloric acid with good stirring. The ethyl acetate phase is separated and the aqueous phase extracted with ethyl acetate (3×150 ml.). The combined ethyl acetate solutions are back washed with water (3×10 ml.), decolorized with Darco G60, filtered and dried over anhydrous sodium sulfate. The dry solution is filtered and evaporated to dryness to give 6.97 g. of crude ester.

The product is then dissolved in dry dioxane (150 ml.), concentrated nitric acid added (1.1 ml.), the solution seeded, scratched and allowed to stand. The nitrate salt precipitates and is filtered off, washed with dioxane, ether and dried. Yield=3.150 g.

The remaining $O^{12a}$-esters of Example XIII are rearranged to their corresponding $O^5$-esters by this same procedure. They are isolated as the nitrate salts.

Example XV.—Mixed $O^{10},O^{12a}$-diacyl derivatives $O^{12a}$-acetyl-$\alpha$-6-deoxy-oxytetracycline (0.005 mole) is dissolved in 5 ml. of dimethylformamide and 3 ml. of propionic anhydride is added all at once. The mixture is stirred slowly as 1.5 ml. of pyridine is added over a ten-minute period, the temperature being held below 40° C. by external cooling. The mixture is cooled to 30° C., stirred at room temperature for one hour, and the product precipitated by the addition of 4 ml. water. The product is recovered by filtration and crystallized from methanol.

In like manner the following mixed $O^{10},O^{12a}$-diacyl compounds of Formula IV are prepared from the $O^{12a}$-acyl-oxytetracyclines of Examples VI, IX, and XIII using the appropriate acid anhydride:

| $R_2$ | $R_3$ | $R_4$ | A | B | A+B |
|---|---|---|---|---|---|
| OH | Methoxyacetoxy | Chloroacetoxy | | | |
| OH | Butyryloxygg | Acetoxy | | | $CH_2$ |
| OH | Acetoxy | Propionyloxy | $C_7H_7SCH_2$ | H | |
| OH | do | Methoxyacetoxy | $\alpha$-$CH_3$ | H | |
| OH | do | do | $\beta$-$CH_3$ | H | |
| OH | Propionyloxy | Acetoxy | $\alpha$-$CH_3$ | H | |
| OH | Valeryloxy | do | 4-($CH_3OOC$)$C_6H_4SCH_2$ | H | |
| OH | Methoxyacetoxy | Butyryloxy | $CF_3SCH_2$ | H | |
| OH | Isobutyryloxy | Valeryloxy | $\beta$-$CH_3$ | H | |
| OH | Acetoxy | Propionyloxy | | | $CH_2$ |
| OH | do | Phenoxyacetoxy | 2,6-($CH_3$)$_2C_6H_3SCH_2$ | H | |
| OH | Phenoxyacetoxy | Acetoxy | | | $CH_2$ |
| OH | $\beta$-Butoxybutyryl | do | | | $CH_2$ |
| OH | Acetoxy | Caproyloxy | $ClCH_2CH(Cl)CH_2SCH_2$ | H | |
| OH | Phenoxycaproyloxy | Acetoxy | | | $CH_2$ |
| OH | Acetoxy | $\beta$-Phenoxypropionyloxy | $C_{32}H_{25}SCH_2$ | | |
| OH | Butyryloxy | Acetoxy | $C_4H_9OCH_2CH_2SCH_2$ | H | |
| OH | do | do | $C_4H_9OOC$—$CH_2SCH_2$ | H | |
| OH | Chloroacetoxy | Methoxyacetoxy | $\alpha$-$CH_3$ | H | |
| OH | Dichloroacetoxy | Acetoxy | $\alpha$-$CH_3$ | H | |
| OH | do | Caproyloxy | | | $CH_2$ |
| OH | 2,6-dibromocaproyloxy | Chloroacetoxy | $ClCH_2CH(CL)CH_2SCH_2$ | H | |
| OH | $\alpha,\alpha$-Dichloropropionyloxy | Phenoxyacetoxy | | | $CH_2$ |
| OH | Methoxyacetoxy | Dichloroacetoxy | $CF_3SCH_2$ | H | |
| OH | Phenoxyacetoxy | Chloroacetoxy | | | $CH_2$ |

TABLE—Continued

| R₂ | R₃ | R₄ | A | B | A+B |
|---|---|---|---|---|---|
| OH | β-Phenoxypropionyloxy | Acetoxy | | | CH₂ |
| OH | α-Phenoxyvaleryloxy | Propionyloxy | β-CH₃ | H | |
| OH | Propionyloxy | Chloroacetoxy | | | CH₂ |
| OH | Caproyloxy | Acetoxy | α-CH₃ | H | |
| OH | Acetoxy | Methoxyacetoxy | C₄H₃O—CH₂SCH₂ | H | |
| OH | γ-Bromobutyryloxy | Acetoxy | β-CH₃ | H | |
| OH | Chloroacetoxy | do | C₇H₇SCH₂ | H | |
| OH | Bromoacetoxy | Propionyloxy | CH₃SCH₂ | H | |
| OH | Acetoxy | Chloroacetoxy | C₆H₅SCH₂ | H | |
| OH | Chloroacetoxy | do | α-CH₃ | H | |
| OH | do | Acetoxy | | | CH₂ |

Example XVI.—$O^5,O^{12a}$-diacyl-oxytetracyclines

A mixture of $O^5$-acetyl-β-6-deoxy-oxytetracycline (10.6 g.), acetic anhydride (300 ml.) and 300 ml. of dioxane is thoroughly stirred then allowed to stand at room temperature for two weeks. The reaction mixture is then evaporated to dryness under reduced pressure. The crude diester is treated with 500 ml. of ether and thoroughly mixed. The etheral solution is separated and stripped to dryness to give the crystalline product $O^5,O^{12a}$-diacetyl-β-6-deoxy-oxytetracycline.

Repetition of the above procedure but using the appropriate $O^5$-acyl-oxytetracyclines of Examples VII, X, and XIV and the proper carboxylic acid anhydride produces the following $O^5,O^{12a}$-diacyl-oxytetracyclines:

$O^5$-acetyl-$O^{12a}$-propionyl-6-demethyl-6-deoxy-6-methylene-
$O^5$-propionyl-$O^{12a}$-acetyl-β-6-deoxy-
$O^5$-phenoxyacetyl-$O^{12a}$-acetyl-α-6-deoxy-
$O^5$-methoxyacetyl-$O^{12a}$-propionyl-β-6-deoxy-
$O^5$-isovaleryl-$O^{12a}$-acetyl-α-6-deoxy-
$O^5$-acetyl-$O^{12a}$-valeryl-α-6-deoxy-13-(acetylmercapto)-
$O^5$-butyryl-$O^{12a}$-methoxyacetyl-6-demethyl-6-deoxy-6-methylene-
$O^5$-caproyl-$O^{12a}$-acetyl-α-6-deoxy-
$O^5,O^{12a}$-dicaproyl-α-6-deoxy-
$O^5,O^{12a}$-diacetyl-α-6-deoxy-
$O^5$-acetyl-$O^{12a}$-propionyl-α-6-deoxy-
$O^5$-methoxyacetyl-$O^{12a}$-chloroacetyl-β-6-deoxy-
$O^5$-chloroacetyl-$O^{12a}$-methoxyacetyl-α-6-deoxy-
$O^5$-methoxyacetyl-$O^{12a}$-dichloroacetyl-β-6-deoxy-
$O^5$-(β-chloropropionyl)-$O^{12a}$-acetyl-β-6-deoxy-
$O^5$-(γ-bromobutyryl)-$O^{12a}$-acetyl-β-6-deoxy-
$O^5$-bromoacetyl-$O^{12a}$-phenoxyacetyl-α-6-deoxy-13-methylmercapto-
$O^5$-(α,α-dichloropropionyl)-$O^{12a}$-acetyl-6-demethyl-6-deoxy-6-methylene-
$O^5$-(6-chlorocaproyl)-$O^{12a}$-methoxyacetyl-α-6-deoxy-
$O^5$-dichloroacetyl-$O^{12a}$-acetyl-β-6-deoxy-
$O^5$-acetyl-$O^{12a}$-isobutyryl-α-6-deoxy-13-(benzylmercapto)-
$O^5$-(w-propoxybutyryl)-$O^{12a}$-acetyl-
$O^5$-acetyl-$O^{12a}$-propionyl-β-6-deoxy-
$O^5$-propionyl-$O^{12a}$-acetyl-α-6-deoxy-
$O^5$-(α-phenoxyvaleryl)-$O^{12a}$-acetyl-β-6-deoxy-
$O^5$-(methoxyacetyl)-$O^{12a}$-propionyl-α-6-deoxy-13-(trifluoromethylmercapto)-
$O^5$-(w-phenoxypropionyl)-$O^{12a}$-acetyl-α-6-deoxy-
$O^5,O^{12a}$-di(α-phenoxyvaleryl)-β-6-deoxy-
$O^5$-acetyl-$O^{12a}$-propionyl-α-6-deoxy-13-(acetylmercapto)-
$O^5,O^{12a}$-diacetyl-α-6-deoxy-13-(n-dodecylmercapto)-
$O^5,O^{12a}$-diacetyl-6-demethyl-6-deoxy-6-methylene-
$O^5,O^{12a}$-di(methoxyacetyl)-6-demethyl-6-deoxy-6-methylene-
$O^5$-(w-phenoxycaproyl)-$O^{12a}$-acetyl-6-demethyl-6-deoxy-6-methylene-
$O^5$-(β-butoxybutyryl)-$O^{12a}$-propionyl-6-demethyl-6-deoxy-6-methylene-
$O^5$-acetyl-$O^{12a}$-(methoxyacetyl)-α-6-deoxy-13-(2,3-dichloropropylmercapto)-
$O^5$-chloroacetyl-$O^{12a}$-acetyl-α-6-deoxy-13-benzylmercapto- Example XVII.—$O^5,O^{10},O^{12a}$-triacyl-oxytetracyclines To $O^5$-acetyl-6-demethyl-6-deoxy-6-methylene-oxytetracycline (10.6 g.) and acetic anhydride (300 ml.) in 100 ml. of dimethylformamide at room temperature there is added slowly with stirring 5 ml. of pyridine during a ten-minute period. The mixture is then cooled to 30° C., stirred at room temperature for 3 hours then treated with an equal volume of water to precipitate the crude $O^5,O^{10},O^{12a}$-triacetyl- derivative. The product is separated and crystallized from methanol-water.

By means of this procedure the $O^5$-acyl-oxytetracyclines of Examples VII, X, and XIV are converted to the following oxytetracycline triacetyl derivatives by reaction with the appropriate acylating agent:

$O^5,O^{10},O^{12a}$-tripropionyl-α-6-deoxy-
$O^5$-acetyl-$O^{12a}$-dipropionyl-α-6-deoxy-
$O^5,O^{10},O^{12a}$-triacetyl-6-demethyl-6-deoxy-6-methylene-
$O^5$-acetyl-$O^{10},O^{12a}$-dicaproyl-6-demethyl-6-deoxy-6-methylene-
$O^5,O^{10},O^{12a}$-tricaproyl-α-6-deoxy-
$O^5,O^{10},O^{12a}$-triacetyl-α-6-deoxy-
$O^5,O^{10},O^{12a}$-triacetyl-α-6-deoxy-13-(benzylmercapto)-
$O^5$-butyryl-$O^{10},O^{12a}$-diacetyl-6-demethyl-6-deoxy-6-methylene-
$O^5,O^{10},O^{12a}$-triacetyl-β-6-deoxy-
$O^5$-acetyl-$O^{10},O^{12a}$-dimethoxyacetyl-β-6-deoxy-
$O^5$-(w-propoxybutyryl)-$O^{10},O^{12a}$-diacetyl-6-demethyl-6-deoxy-6-methylene-
$O^5,O^{10},O^{12a}$-tri-(α-phenoxyvaleryl)-β-6-deoxy-
$O^5,O^{10},O^{12a}$-tributyryl-α-6-deoxy-13-(β-butoxyethylmercapto)-
$O^5$-acetyl-$O^{10},O^{12a}$-diphenoxyacetyl-α-6-deoxy-13-(2,3-dichloropropylmercapto)-
$O^5,O^{10},O^{12a}$-tri(chloroacetyl)-6-demethyl-6-deoxy-6-methylene-
$O^5$-chloroacetyl-$O^{10},O^{12a}$-dimethoxyacetyl-α-6-deoxy-
$O^5,O^{10},O^{12a}$-tri(dichloroacetyl)-6-demethyl-6-deoxy-6-methylene-
$O^5$-dichloroacetyl-$O^{10},O^{12a}$-dipropionyl-6-demethyl-6-deoxy-6-methylene-
$O^5$-(6-bromocaproyl)-$O^{10},O^{12a}$-diacetyl-β-6-deoxy-
$O^5$-(α,β-dichloropropionyl)-$O^{10},O^{12a}$-diisobutyryl-α-6-deoxy-
$O^5$-(α-chloropropionyl)-$O^{10},O^{12}$-diacetyl-α-6-deoxy-13-(2,3-dichloropropylmercapto)-
$O^5$-(2,6-dibromocaproyl)-$O^{10},O^{12a}$-dicaproyl-α-6-deoxy-(2,3-dichloropropylmercapto)-
$O^5$-dichloroacetyl-$O^{10},O^{12a}$-diphenoxyacetyl-α-6-deoxy- Example XVIII.—$O^5,O^{10},O^{12a}$-triacyl-oxytetracyclines A mixture of $O^{10},O^{12a}$-diacetyl-6-demethyl-6-deoxy-6-methylene-oxytetracycline (5.3 g.) and acetic anhydride (300 ml.) in 200 ml. of dry dioxane is stored at room temperature for two weeks. The mixture is evaporated to dryness under vacuum at room temperature. The $O^5,O^{10},O^{12a}$-triacetyl- product is identical to that prepared in Example XIII.

Utilizing the $O^{10},O^{12a}$-diacyl-oxytetracyclines of Examples V and XV as reactants, the following $O^5,O^{10},O^{12a}$-triacyl-oxytetracyclines are prepared:

$O^5,O^{10},O^{12a}$-triacetyl-α-6-deoxy-
$O^5$-acetyl-$O^{10},O^{12a}$-diisovaleryl-α-6-deoxy- $O^5$-propionyl-$O^{10},O^{12a}$-diacetyl-$\beta$-6-deoxy-
$O^5$-methoxyacetyl-$O^{10},O^{12a}$-diacetyl-$\alpha$-6-deoxy-
$O^5$-phenoxyacetyl-$O^{10},O^{12a}$-diacetyl-$\alpha$-6-deoxy-
$O^5$-butyryl-$O^{10},O^{12a}$-di(w-propoxybutyryl)-6-demethyl-6-deoxy-6-methylene-
$O^5$-($\beta$-methoxybutyryl)-$O^{10},O^{12a}$-diacetyl-$\beta$-6-deoxy-
$O^5$-methoxyacetyl-$O^{10}$,acetyl-$O^{12a}$-valeryl-$\alpha$-6-deoxy-
$O^5$-methoxyacetyl-$O^{10}$,propionyl-$O^{12a}$-acetyl-6-demethyl-6-deoxy-6-methylene-
$O^5$-phenoxyacetyl-$O^{10}$-acetyl-$O^{12a}$-butyryl-6-demethyl-6-deoxy-6-methylene-
$O^5$-valery-$O^{10}$-methoxyacetyl-$O^{12a}$-acetyl-$\alpha$-6-deoxy-
$O^5,O^{12a}$-diacetyl-$O^{10}$-propionyl-$\alpha$-6-deoxy-13-(benzylmercapto)-
$O^5$-valeryl-$O^{10}$-acetyl-$O^{12a}$-butyryl-$\alpha$-6-deoxy-13-($\beta$-butoxyethylmercapto)-
$O^5,O^{12a}$-di(chloroacetyl)-$O^{10}$-methoxyacetyl-$\alpha$-6-deoxy-
$O^5$-methoxyacetyl-$O^{10},O^{12a}$-di(chloroacetyl)-$\alpha$-6-deoxy-
$O^5$-acetyl-$O^{10},O^{12a}$-di($\gamma$-bromobutyryl)-$\beta$-6-deoxy-
$O^5$-phenoxyacetyl-$O^{10},O^{12a}$-di(chloroacetyl)-$\alpha$-6-deoxy-13-benzylmercapto-
$O^5$-propionyl-$O^{10},O^{12a}$-di($\alpha,\alpha$-dichloropropionyl)-6-demethyl-6-deoxy-6-methylene-
$O^5$-acetyl-$O^{10}$-methoxyacetyl-$O^{12a}$-chloroacetyl-$\alpha$-6-deoxy-
$O^5,O^{12a}$-dicetyl-$O^{10}$-chloracetyl-$\alpha$-6-deoxy-13-phenylmercapto-
$O^5,O^{10},O^{12a}$-tri($\beta$-chloropropionyl)-6-demethyl-6-deoxy-6-methylene- Example XIX.—$O^5,O^{10},O^{12a}$-triacyl-oxytetracyclines The following triacylated oxytetracyclines are produced from the $O^5,O^{12a}$-diacyl derivatives of Example XVI by the procedure of Example V:

$O^5,O^{10},O^{12a}$-triacetyl-$\beta$-6-deoxy-
$O^5,O^{12a}$-diacetyl-$O^{10}$-methoxyacetyl-6-demethyl-6-deoxy-6-methylene-
$O^5,O^{10}$-di(phenoxyacetyl)-$O^{12a}$-acetyl-$\alpha$-6-deoxy-
$O^5$-acetyl-$O^{10}$-phenoxyacetyl-$O^{12a}$-valeryl-$\alpha$-6-deoxy-13-(acetylmercapto)-
$O^5,O^{12a}$-diacetyl-$O^{10}$-($\beta$-phenoxypropionyl)-$O^{12a}$-propionyl-$\alpha$-6-deoxy-13-(n-dodecylmercapto)-
$O^5,O^{12a}$-diacetyl-$O^{10}$-phenoxyacetyl-$\alpha$-6-deoxy-
$O^5$-methoxyacetyl-$O^{10}$-caproyl-$O^{12a}$-propionyl-$\alpha$-6-deoxy-13-(trifluoromethylmercapto)-
$O^5$-propionyl-$O^{10}$-methoxyacetyl-$O^{12a}$-acetyl-$\alpha$-6-deoxy-
$O^5$-acetyl-$O^{10}$-phenoxyacetyl-$O^{12a}$-propionyl-$\beta$-6-deoxy-
$O^5$-acetyl-$O^{10}$-butyryl-$O^{12a}$-propionyl-$\alpha$-6-deoxy-13-(acetylmercapto)-
$O^5,O^{12a}$-diacetyl-$O^{10}$-chloroacetyl-$\alpha$-6-deoxy-
$O^5,O^{12a}$-diacetyl-$O^{10}$-dichloroacetyl-$\alpha$-6-deoxy-
$O^5,O^{12a}$-di($\alpha$-phenoxyvaleryl)-$O^{10}$-chloroacetyl-$\beta$-6-deoxy-
$O^5,O^{10}$-di(bromoacetyl)-$O^{12a}$-phenoxyacetyl-$\alpha$-6-deoxy-13-methylmercapto-
$O^5$-dichloroacetyl-$O^{10},O^{12a}$-diacetyl-$\beta$-6-deoxy-
$O^5$-(6-chlorocaproyl)-$O^{10}$-acetyl-$O^{12a}$-methoxyacetyl-$\alpha$-6-deoxy-
$O^5,O^{10}$-di($\alpha,\alpha$-dichloropropionyl)-$O^{12a}$-acetyl-6-demethyl-6-deoxy-6-methylene- Example XX.—Hydrolysis of $O^5,O^{10},O^{12a}$-triacyl-oxytetracyclines The $O^5,O^{10},O^{12a}$-triacyl derivatives of Examples XII, XVIII, and XIX are converted to the corresponding $O^5,O^{12a}$-diacyl derivatives by the procedure of Example VI.

Example XXI.—Metal salt formation (A) To one millimole of $O^5$-acetyl-oxytetracycline dissolved in the minimum volume of N,N-dimethylformamide there is added an equimolar proportion of sodium hydroxide in the same solvent. The mixture is thoroughly stirred and the sodium salt precipitated by the addition of a large volume of ether.

(B) Substitution of the appropriate oxide or hydroxide for sodium hydroxide produces the corresponding potassium, lithium, calcium, barium, magnesium, zinc, aluminum, ferric, copper, cobalt, and nickel salts.

(C) The complex salts, that is, the chelates, are prepared by using a metal salt other than the oxide or hydroxide. Thus, using magnesium chloride, calcium bromide, zinc chloride, cadmium acetate, copper sulfate .5$H_2O$, cobalt nitrate or nickel chloride the corresponding chelate is prepared.

(D) Application of these procedures to the remaining esters of this invention produces the corresponding salts.

EXAMPLE XXII

The acid addition salts are prepared by dissolving the chosen ester in the minimum volume of N,N-dimethylformamide and adding an equimolar amount of the desired acid. The mixture is stirred and the acid salt precipitated by the addition of several volumes of ether. The salt is collected, washed and dried.

By means of this procedure, the hydrochloride, hydrobromide, hydroiodide, nitrate, sulfate, phosphate, p-toluenesulfonate, citrate, acetate, gluconate, butyrate, benzoate, amsonate, pamoate, stearate, fumarate, maleate, tartrate, laurate and 2-hydroxy-3-naphthoate salt of the herein described esters are prepared.

What is claimed is:

1. A compound selected from the group consisting of those having the formulae

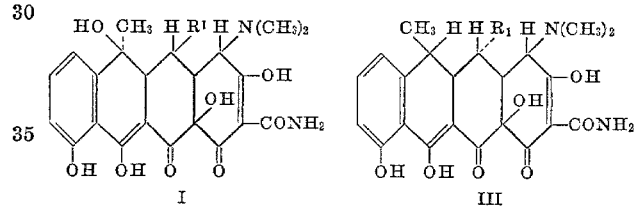

and the pharmaceutically acceptable acid addition and metal salts thereof wherein $R_1$ is selected from the group consisting of alkanoyloxy, phenoxyalkanoyloxy, lower alkoxyalkanoyloxy, monochloroalkanoyloxy, monobromoalkanoyloxy, dichloroalkanoyloxy and dibromoalkanoyloxy wherein the alkanoyloxy group has from 2 to 6 carbon atoms.

2. The compound of claim 1, Formula I, wherein $R_1$ is acetoxy.

3. The compound of claim 1, Formula I, wherein $R_1$ is methoxyacetoxy.

4. The compound of claim 1, Formula I, wherein $R_1$ is monochloroacetoxy.

5. The compound of claim 1, Formula III, wherein $R_1$ is phenoxyacetoxy.

6. The hydrochloride salt of the compound of claim 1, Formula I, wherein $R_1$ is acetoxy.

7. The magnesium salt of the compound of claim 1, Formula I, wherein $R_1$ is acetoxy.

8. A compound having the formula

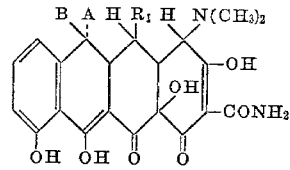

and the pharmaceutically acceptable acid addition and metal salts thereof wherein A is selected from the group consisting of methyl and $YSCH_2$; Y is selected from the group consisting of primary and secondary alkyl having up to 12 carbon atoms, phenyl, mono- and disubstituted phenyl, benzoyl, trifluoromethyl; R"CO where R" is alkyl of from 1 to 3 carbon atoms; and R'$CH_2$— wherein R' is selected from the group consisting of mono- and disubstituted lower alkyl, lower carbalkoxy, halo, phenyl, mono-and disubstituted phenyl and furyl, each substituent of said mono- and disubstituted lower alkyl being selected from the group consisting of lower alkoxy, lower carbalkoxy, and halo, provided that where two of said substituents are joined to the same carbon atom at least one is lower carbalkoxy, and each substituent of said mono- and disubstituted phenyl being selected from the group consisting of lower alkyl, lower alkoxy, lower carbalkoxy and nitro;

B is hydrogen;

A and B when taken together are methylene;

and $R_1$ is selected from the group consisting of alkanoyloxy, phenoxyalkanoyloxy, lower alkoxyalkanoyloxy, monochloroalkanoyloxy, monobromoalkanoyloxy, dichloroalkanoyloxy and dibromoalkanoyloxy wherein the alkanoyloxy group has from 2 to 6 carbon atoms.

9. The compound of claim 8 wherein $R_1$ is acetoxy, A is methyl and B is hydrogen.

10. The compound of claim 8 wherein $R_1$ is butyryloxy and A and B taken together are methylene.

11. The compound of claim 8 wherein $R_1$ is phenoxyacetoxy, A is methyl and B is hydrogen.

12. The compound of claim 8 wherein $R_1$ is methoxyacetoxy, A is trifluoromethylmarcaptomethyl and B is hydrogen.

13. The compound of claim 8 wherein $R_1$ is methoxyacetoxy and A and B taken together are methylene.

14. The compound of claim 8 wherein $R_1$ is monochloroacetoxy, A is methyl and B is hydrogen.

15. The compound of claim 8 wherein $R_1$ is monochloroacetoxy and A and B taken together are methylene.

References Cited

UNITED STATES PATENTS 2,812,349  11/1957  Gordon _____ 260—559AI

JAMES A. PATTEN, Primary Examiner

J. F. TERAPANE, Assistant Examiner

U.S. Cl. X.R.

260—347.4, 429.9, 438.1, 439, 448, 455, 470, 471, 477, 484, 487, 490, 559; 424—285, 289, 294, 295, 305, 308, 311

PO-1050
(5/69)

UNITED STATES PATENT OFFICE
CERTIFICATE OF CORRECTION

Patent No. 3,579,564      Dated May 18, 1971

Inventor(s) Robert K. Blackwood and Manfred Schach von Wittenau

It is certified that error appears in the above-identified patent and that said Letters Patent are hereby corrected as shown below:

Col. 1, line 6, "March 15, 1966" should read -- Mar. 15, 1965 --.

Col. 3, line 29, "500°C." should read -- 50°C. --.

Signed and sealed this 14th day of September 1971.

(SEAL)
Attest:

EDWARD M. FLETCHER, JR.
Attesting Officer

ROBERT GOTTSCHALK
Acting Commissioner of Patents